(12) United States Patent
Tamir et al.

(10) Patent No.: US 9,467,511 B2
(45) Date of Patent: Oct. 11, 2016

(54) TECHNIQUES FOR USE OF VENDOR DEFINED MESSAGES TO EXECUTE A COMMAND TO ACCESS A STORAGE DEVICE

(71) Applicant: Intel Corporation, Santa Clara, CA (US)

(72) Inventors: Eliezer Tamir, Bait Shemesh (IL); Ben-Zion Friedman, Jerusalem (IL); Steen Larsen, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 325 days.

(21) Appl. No.: 13/743,112

(22) Filed: Jan. 16, 2013

(65) Prior Publication Data
US 2013/0198311 A1    Aug. 1, 2013

Related U.S. Application Data

(60) Provisional application No. 61/587,541, filed on Jan. 17, 2012.

(51) Int. Cl.
*G06F 13/12*       (2006.01)
*G06F 15/167*      (2006.01)
*H04L 29/08*       (2006.01)
*G06F 21/80*       (2013.01)
*G06F 21/44*       (2013.01)
*G06F 21/79*       (2013.01)
(Continued)

(52) U.S. Cl.
CPC ......... *H04L 67/1097* (2013.01); *G06F 3/0611* (2013.01); *G06F 3/0659* (2013.01); *G06F 3/0683* (2013.01); *G06F 15/167* (2013.01); *G06F 21/44* (2013.01); *G06F 21/79* (2013.01); *G06F 21/80* (2013.01); *H04L 69/12* (2013.01)

(58) Field of Classification Search
CPC . H04L 67/1097; H04L 69/12; G06F 15/167; G06F 3/0659; G06F 3/0611; G06F 3/0683; G06F 21/79; G06F 21/80; G06F 21/44
See application file for complete search history.

(56) References Cited

U.S. PATENT DOCUMENTS 7,711,835 B2    5/2010  Braddy et al.
7,756,943 B1    7/2010  Wong
(Continued)

OTHER PUBLICATIONS

"NVM Express—The interface Standard for PCI Express SSDs" by Kevin Marks and Peter Onufryk, Flash Memory Summit 2011.*
(Continued)

*Primary Examiner* — Henry Tsai
*Assistant Examiner* — Jing-Yih Shyu

(57) ABSTRACT

Examples are disclosed for use of vendor defined messages to execute a command to access a storage device maintained at a server. In some examples, a network input/output device coupled to the server may receive the command from a client remote to the server for the client to access the storage device. For these examples, elements or components of the network input/output device may be capable of forwarding the command either directly to a Non-Volatile Memory Express (NVMe) controller that controls the storage device or to a manageability module coupled between the network input/out device and the NVMe controller. Vendor specific information may be forwarded with the command and used by either the NVMe controller or the manageability module to facilitate execution of the command. Other examples are described and claimed.

23 Claims, 12 Drawing Sheets

(51) Int. Cl.
  *H04L 29/06* (2006.01)
  *G06F 3/06* (2006.01)

(56) References Cited

U.S. PATENT DOCUMENTS

| | | | |
|---|---|---|---|
| 7,895,286 B1 | 2/2011 | Kilbourne et al. | |
| 7,921,177 B2 | 4/2011 | Raisch et al. | |
| 8,463,881 B1 * | 6/2013 | Baker et al. | 709/220 |
| 8,554,968 B1 * | 10/2013 | Onufryk et al. | 710/260 |
| 8,560,693 B1 | 10/2013 | Wang et al. | |
| 8,588,228 B1 * | 11/2013 | Onufryk et al. | 370/389 |
| 2004/0205253 A1 | 10/2004 | Arndt et al. | |
| 2009/0292861 A1 * | 11/2009 | Kanevsky et al. | 711/103 |
| 2010/0083247 A1 | 4/2010 | Kanevsky et al. | |
| 2011/0246597 A1 * | 10/2011 | Swanson et al. | 709/212 |
| 2014/0181365 A1 | 6/2014 | Fanning et al. | |

OTHER PUBLICATIONS

"IDF-2012-NVM-Express-and-the-PCI-Express-SSD-Revolution" by Danny Cobb and Amber Huffman, IDF 2012.*
"NVMe and PCIe SSDs NVMe Management Interface" by Peter Onufryk and Austin Bolen, Flash Memory Summit 2014.*
Office Action received for U.S. Appl. No. 13/997,996, mailed Oct. 6, 2014, 18 pages.
International Search Report and Written Opinion received for PCT Patent Application No. PCT/US2013/021759, mailed Apr. 23, 2013, 9 pages.
Office Action received for U.S. Appl. No. 13/997,996 mailed Dec. 4, 2015, 19 pages.
Office Action received for Chinese Patent Application No. 201380005847.2, mailed Mar. 23, 2016, 8 pages.

* cited by examiner

VDM Format 510

| Buffer ID(s) | Credits Used |
|---|---|
| 512 | 514 |

VDM Format 520

| Buffer ID(s) | Credits Available |
|---|---|
| 522 | 524 |

RECEIVE A COMMAND FROM A CLIENT TO ACCESS A STORAGE DEVICE CONTROLLED BY AN NVMe CONTROLLER MAINTAINED AT A SERVER
802

INCLUDE A FIRST VENDOR DEFINED MESSAGE WITH THE COMMAND TO CAUSE THE NVMe CONTROLLER TO EXECUTE THE COMMAND
804

FORWARD THE COMMAND WITH THE FIRST VENDOR DEFINED MESSAGE TO THE NVMe CONTROLLER
806

RECEIVE A COMMAND COMPLETION MESSAGE WITH A SECOND VENDOR DEFINED MESSAGE FROM THE NVMe CONTROLLER AND FORWARD A STATUS OF THE EXECUTED COMMAND TO THE CLIENT BASED, AT LEAST IN PART, ON THE SECOND VENDOR DEFINED MESSAGE
808

*FIG. 8*

Storage Medium 900

*Computer Executable Instructions for 800*

FIG. 9

| NW I/O Device 1000 |  |
|---|---|
| Processing Component 1040 | Other Platform Components 1050 |
| Apparatus 700 | |
| Storage Medium 900 | Communications Interface 1060 |

FIG. 10

TECHNIQUES FOR USE OF VENDOR DEFINED MESSAGES TO EXECUTE A COMMAND TO ACCESS A STORAGE DEVICE

RELATED CASES

This application claims priority to U.S. Provisional Patent Application No. 61/587,541, filed on Jan. 17, 2012.

BACKGROUND

In an example conventional computing arrangement, a client and a server include respective network interface controllers (NICs) or network (NW) input/output (I/O) devices that are capable of communicating with each other using a Remote Direct Memory Access (RDMA) protocol. The server includes a host processor that executes the server's operating system and associated drivers. The server may also include a storage controller that manages access to storage maintained at or by the server. The client's NW I/O device issues requests to the server's NW I/O device to write data to and read data from the storage maintained by the server. The server's operating system, associated drivers, and host processor process the requests received by the server's NW I/O device, and issues corresponding requests to the storage controller. The storage controller receives and executes these corresponding requests. After executing the corresponding requests, the storage controller issues request completion information (and associated data if data has been read from the storage) to the server's operating system and associated drivers. From this, the server's operating system, associated drivers, and host processor generate corresponding request completion information and associated data, and issue the corresponding request completion information and associated data to the server's NW I/O device. The server's NW I/O device then issues the corresponding request completion information and associated data to the client's NW I/O device.

Thus, in the foregoing conventional arrangement, the server's operating system, associated drivers, and host processor process requests received by the server's NW I/O device, and the completion information and data from the storage. This may consume substantial amounts of operating system and host processor processing bandwidth. It may also increase the amount of energy consumed and heat dissipated by the host processor. Furthermore, it may increase the latency involved in processing the requests issued by the client's NW I/O device. It is with respect to these and other challenges that the examples described herein are needed.

BRIEF DESCRIPTION OF THE DRAWINGS

FIG. 5 illustrates example vendor defined message (VDM) formats.
FIG. 8 illustrates an example of a first logic flow.
FIG. 9 illustrates an example of a first storage medium.
FIG. 10 illustrates an example network input/output device.

DETAILED DESCRIPTION

Figure 1:
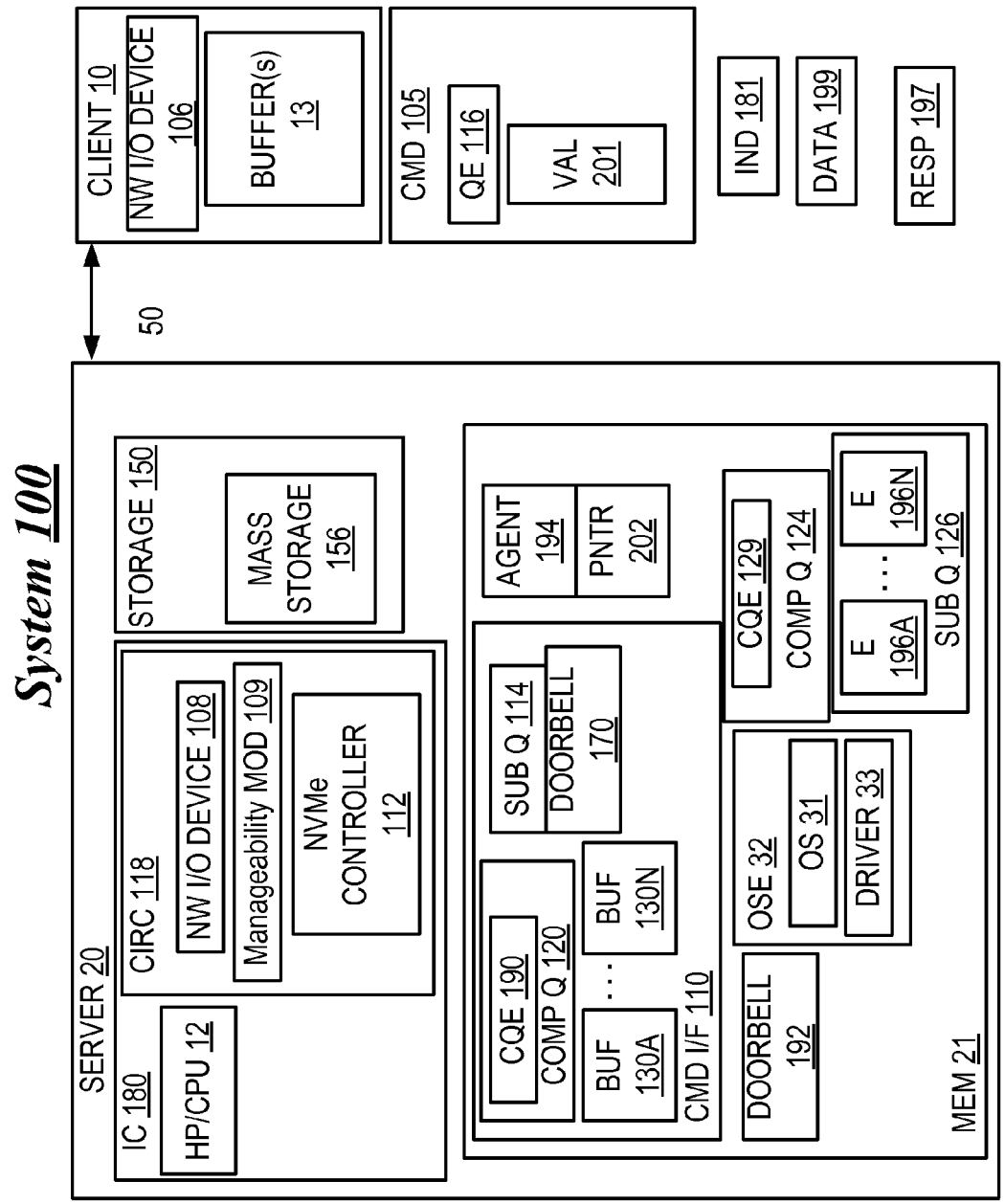
FIG. 1 illustrates a first example system.

As contemplated in the present disclosure, substantial amounts of operating system and host processor processing bandwidth may be consumed in a conventional arrangement between a client and a server when the client attempts to access storage maintained by the server. Recently, servers are including both NW I/O devices and storage controllers having enhanced capabilities that try to minimize operating system and host processor involvement. For example, hardware elements such as command submission and command completion queues may be utilized by a server's NW I/O device and storage controllers to enable a remote client to access storage via a process known as remote direct memory access (RDMA).

Storage controllers are also being designed to operate in compliance with relatively new interconnect communication protocols that may work well with RDMA. Further, these storage controllers may control access to hard disk drives (HDDs) or solid state drives (SSDs). The SSDs may include, but are not limited to, various types of non-volatile memory such as 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM). In some examples, access to HDDs or SSDs may include use of interconnect communication protocols described in industry standards or specifications (including progenies or variants) such as the Peripheral Component Interconnect (PCI) Express Base Specification, revision 3.0, published in November 2010 ("PCI Express" or "PCIe") and/or the Non-Volatile Memory Express (NVMe) Specification, revision 1.1, published in October 2012.

Storage controllers that operate in compliance with the NVMe Specification ("NVMe controllers") may be capable of minimizing operating system and host processor involvement when allowing a remote client to access storage such as an SSD or an HDD. These types of NVMe controllers may not have built-in security checks to control access to the SSD or HDD by the client. In some deployment, intimate knowledge of the design details of the storage controller may be needed by manufacturers of NW I/O devices in order to set-up and then maintain communications with little to no operating system and host processor involvement. However, this may lead to some inflexibility to interchange devices from a host computing platform. Also, operators may be limited to utilize NW I/O devices and NVMe controllers that were made by the same manufacturer that has the intimate knowledge needed for these types of deployments. Since NW I/O devices and NVMe controllers may be separately made by disparate types of manufactures (e.g., ones focused on network communications and others focused on storage communications) the number of manufacturers making both types of devices may be limited.

Rather than require such detail of design, both the PCIe and the NVMe Specification allow for the use of vendor defined messages for communications between devices operating in compliance with either of these specification. The vendor defined messages may be used to generate or create a type of generic interface for communications between NW I/O devices and NVMe controllers to pass commands and completions between these devices. It is with respect to these and other challenges that the examples described herein are needed.

In some examples, techniques associated with use of vendor defined messages to execute a command to access a storage device controlled by an NVMe controller maintained at a server may be implemented. For these examples, circuitry for a NW I/O device coupled to the server may be capable of supporting one or more components associated with receiving a command for a client remote to the server to access the storage device. The one or more components may also be capable of including a first vendor defined message with the command to cause the NVMe controller to execute the command. The one or more components may then forward the command with the first vendor defined message to the NVMe controller. A command completion may be received from the NVMe controller having a second vendor defined message. The second vendor defined message may be used by the one or more components to indicate a status of completion of the command to the client that originated the command.

FIG. 1 illustrates an example a first example system. As shown in FIG. 1 the first example system includes a system 100 having a client 10 that is communicatively coupled, via network 50, to server 20. According to some examples, the terms "host computer," "host," "server," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. Although client 10, server 20, and network 50 will be referred to in the singular, it should be understood that each such respective component may comprise a plurality of such respective components without departing from these examples. According to some examples, a "network" may be or comprise any mechanism, instrumentality, modality, and/or portion thereof that permits, facilitates, and/or allows, at least in part, two or more entities to be communicatively coupled together. Also in some examples, a first entity may be "communicatively coupled" to a second entity if the first entity is capable of transmitting to and/or receiving from the second entity one or more commands and/or data. Also, data and information may be used interchangeably, and may be or comprise one or more commands (for example one or more program instructions), and/or one or more such commands may be or comprise data and/or information. Also for these examples, an "instruction" may include data and/or one or more commands.

Client 10 may include remote direct memory access (RDMA)-enabled network interface controller (RNIC) herein referred to as network (NW) I/O device 106 and/or one or more (and in the example shown in FIG. 1, a plurality of) buffers 13.

As shown in FIG. 1, server 20 may include one or more integrated circuit (IC) chips 180, memory 21, and/or storage 150. One or more chips 180 may have circuitry 118 that may include, a NW I/O device 108, a manageability module 109 or an NVMe controller 112. Although not shown in FIG. 1, in some examples NW I/O device 108 and/or NVMe controller 112 may be separately attachable devices that couple to server 20 and include circuitry as described further below.

Also as shown in FIG. 1, the one or more chips 180 that may be incorporated within one or more multi-core host processors (HP) and/or central processing units (CPU) 12. Although not shown in the Figures, server 20 also may comprise one or more chipsets or devices to include, but not limited to memory or input/output controller circuitry). NW I/O device 108, NVMe controller 112, and/or HP/CPU 12 may be capable of communicating with each other. Additionally, NW I/O device 108, NVMe controller 112, manageability module 109 and/or HP/CPU 12 may be capable of accessing and/or communicating with one or more other components of server 20 (such as, memory 21 and/or storage 150), via one or more such chipsets. In some examples, client 10 and/or NW I/O device 106 may be remote (e.g., geographically remote), at least in part, from server 20 and/or NW I/O device 108.

According to some examples, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also, in some examples, a processor, HP, CPU, processor core (PC), core, and controller each may comprise respective circuitry capable of performing, at least in part, one or more arithmetic and/or logical operations, and/or of executing, at least in part, one or more instructions. An integrated circuit chip may include one or more microelectronic devices, substrates, and/or dies. Although not shown in the FIG. 1, server 20 may have a graphical user interface system that may include, e.g., a respective keyboard, pointing device, and display system that may permit a human user to input commands to, and monitor the operation of, server 20 and/or system 100. Also, memory may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

In some examples, storage 150 may include mass storage 156. For these examples, storage 150 may include one or more devices into, and/or from which, data may be stored and/or retrieved, respectively. Also, for these examples, mass storage may include storage capable of non-volatile storage of data. For example, mass storage 156 may include, without limitation, one or more non-volatile electro-mechanical, magnetic, optical, and/or semiconductor storage devices. These devices may include hard disk drives (HDDs) or solid state drives (SSDs). The SSDs may have non-volatile types of memory such as 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

According to some examples, manageability module 109, NVMe controller 112, storage 150 or mass storage 156 may be capable of operating in compliance with the PCIe Specification and/or the NVMe Specification.

One or more machine-readable program instructions may be stored, at least in part, in memory 21. In operation of server 20, these machine-readable instructions may be accessed and executed by one or more host processors 12, NW I/O device 108, and/or NVMe controller 112. When executed by one or more HP/CPU 12, these one or more machine-readable instructions may result in one or more operating system environments (OSE) 32 being executed at least in part by one or more HP/CPU 12, and becoming resident at least in part in memory 21. Also when these machine-readable instructions are executed by NW I/O device 108 and/or NVMe controller 112, these one or more instructions may result in one or more command interfaces 110 of NVMe controller 112, one or more doorbells 192, one or more pointers 202, one or more agents 194, one or more completion queues 124, and/or one or more submission queues 126 being established and/or executed by NW I/O device 108 and/or NVMe controller 112, and/or becoming resident in memory 21.

According to some examples, one or more OSE 32 may include one or more operating systems (OS) 31 and/or one or more NW I/O device and/or NVMe controller drivers 33. These one or more drivers 33 may be mutually distinct from one or more OS 31, at least in part. Alternatively or additionally, without departing from these examples, one or more respective portions of one or more OS 31 and/or drivers 33 may not be mutually distinct, at least in part, from each other and/or may be included, at least in part, in each other. Likewise, without departing from these examples, circuitry 118, NW I/O device 108, manageability module 109 and/or NVMe controller 112 may be distinct from, or alternatively, may be included in the one or more not shown chipsets and/or HP/CPU 12. Also without departing from these examples, one or more portions of memory 21 may be included in or maintained at NW I/O device 108, manageability module 109, NVMe controller 112, circuitry 118, HP/CPU 12, and/or IC 180.

In some examples, a portion or subset of an entity may include all or less than all of the entity. Also, for these examples, a process, thread, daemon, program, driver, operating system, application, kernel, and/or virtual machine monitor each may (1) include, at least in part, and/or (2) result, at least in part, in and/or from, execution of one or more operations and/or program instructions.

According to some examples, a command interface may facilitate, permit, and/or implement, at least in part, exchange, transmission, and/or receipt of data and/or one or more commands. For these examples, a queue, buffer, and/or doorbell may be one or more locations (e.g., specified and/or indicated, at least in part, by one or more addresses) in memory in which data and/or one or more commands may be stored, at least temporarily. Also, a queue element may include data and/or one or more commands to be stored and/or stored in one or more queues, such as, for example, one or more descriptors and/or one or more commands. Additionally, for these examples, a pointer may indicate, address, and/or specify, at least in part, one or more locations and/or one or more items in memory.

In some examples, NW I/O device 106 and NW I/O device 108 may exchange data and/or commands via network 50 in accordance with one or more protocols that may comply and/or be compatible with an RDMA protocol such as Internet Wide Area RDMA protocol (iWARP), Infiniband (IB) protocol, Ethernet protocol, Transmission Control Protocol/Internet Protocol (TCP/IP) protocol and/or RDMA over Converged Ethernet (RoCE) protocol. For example, the iWARP protocol may comply and/or be compatible with Recio et al., "An RDMA Protocol Specification," Internet Draft Specification, Internet Engineering Task Force (IETF), 21 Oct. 2002. Also for example, the Ethernet protocol may comply and/or be compatible with Institute of Electrical and Electronics Engineers, Inc. (IEEE) Std. 802.3-2008, Dec. 26, 2008. Additionally, for example, the TCP/IP protocol may comply and/or be compatible with the protocols described in Internet Engineering Task Force (IETF) Request For Comments (RFC) 791 and 793, published September 1981. Also, the IB protocol may comply and/or be compatible with Infiniband Architecture Specification, Vol. 2, Rel. 1.3, published November 2012. Additionally, for example, the RoCE protocol may comply and/or be compatible with Supplement to Infiniband Architecture Specification, Vol. 1, Rel. 1.2.1, Annex A16: "RDMA over Converged Ethernet (RoCE)", published April 2010. Many different, additional, and/or other protocols may be used for such data and/or command exchange without departing from these examples (e.g., earlier and/or later-developed versions of the aforesaid, related, and/or other protocols).

According to some examples, circuitry 118 may permit and/or facilitate, at least in part, NW I/O device 106's access, via NW I/O device 108, of one or more command interfaces 110. For example, circuitry 118 may permit and/or facilitate, at least in part, NW I/O device 106 being able to access one or more command interfaces 110 in a manner that is independent of OSE 32 in server 20. This accessing may include, for example, the writing of at least one queue element (e.g., one or more queue elements (QE) 116) to one or more submission queues 114 in one or more command interfaces 110. This may cause NW I/O device 108 for forward commands to NVMe controller 112 to perform, at least in part, one or more operations involving storage 150 and/or mass storage 156 associated with NVMe controller 112. NVMe controller 112 may perform these one or more operations in response, at least in part, to the one or more queue elements 116 (e.g., after and in response, at least in part, to the one or more queue elements 116 being written into one or more submission queues 114 and then forwarded by NW I/O device 108). These one or more operations involving storage 150 and/or mass storage 156 may comprise one or more write operations and/or one or more read operations involving, at least in part, storage 150 and/or mass storage 156. For these examples, client 10 thus may be able to access storage 150 and/or mass storage 156 via the one or more read operations and/or one or more write operations executed by NVMe controller 112.

By way of example, in operation of system 100, client 10 and/or NW I/O device 106 may authenticate client 10 and/or NW I/O device 106 to server 20 and/or logic and/or features at NW I/O device 108. This may result in client 10 and/or NW I/O device 106 being granted permission to access, at least in part, devices maintained at or controlled by elements of server 20 (e.g., via NW I/O device 108). Contemporaneously, after, or prior to this, at least in part, NW I/O device 108, NVMe controller 112, one or more agents 194, and/or OSE 32 may generate, establish, and/or maintain, at least in part, in memory 21, one or more command interfaces 110 and/or one or more indicators 181 that may indicate, at least in part, where (e.g., one or more locations) in memory 21 one or more command interfaces 110 and/or the components thereof may be located. For example, one or more indicators 181 may indicate, at least in part, one or more locations in memory 21 where one or more submission queues 114, one or more completion queues 120, one or more doorbells 170, and/or one or more buffers 130A . . . 130N may be located. NW I/O device 108 may provide, via network 50, one or more indicators 181 to NW I/O device 106. Thereafter, NW I/O device 106 may use one or more of the one or more indicators 181 to access one or more command interfaces 110 and/or one or more components of the one or more command interfaces 110. One or more indicators 181 may be or comprise, at least in part, one or more handles (e.g., assigned to transaction contexts) for one or more regions in memory 21, such as, in this embodiment, one or more service tags (STags) or transaction tags (TTags) that may comply and/or may be compatible with an RDMA (e.g., iWARP, IB, RoCE) protocol. In some examples, the one or more regions in memory 21 may be included in one or more bounce buffers maintained to facilitate remote access of storage 150 or mass storage 156 by client 10.

After receiving one or more indicators 181, client 10 and/or NW I/O device 106 may issue one or more commands 105 to server 20, via network 50 and NW I/O device 108, to NVMe controller 112 in a manner that by-passes and/or is independent of the involvement of OSE 32. The one or more commands 105 may command NVMe controller 112 to perform one or more operations involving storage 150 and/or mass storage 156.

According to some examples, one or more commands 105 may comply and/or be compatible with an RDMA (e.g., iWARP, IB, RoCE) protocol. One or more commands 105 may include and/or specify, at least in part, one or more queue elements 116 that may embody and/or indicate, at least in part, the one or more operations involving storage 150 and/or mass storage 156 that are being commanded. Although not shown in FIG. 1, one or more commands 105 may comprise, specify, and/or indicate, at least in part, one or more of the indictors 181 that may indicate one or more locations in one or more submission queues 114 as one or more intended destinations of one or more queue elements 116.

In some examples, one or more queue elements 116 may result in NW I/O device 108 forwarding a command to have NVMe controller 112 perform or execute one or more write operations involving storage 150 and/or mass storage 156. Therefore, one or more commands 105 also may include and/or specify, at least in part, data 199 to be written, as a result of NW I/O device 108 forwarding one or more queue elements 116 to NVMe controller 112, to storage 150 and/or mass storage 156. One or more commands 105 may include, specify, and/or indicate, at least in part, one or more of the indicators 181 that may indicate one or more locations of one or more buffers (e.g., buffer(s) 13) to which data 199 is to be written (at least temporarily) to a client 10.

In response, at least in part, to receipt of one or more commands 105, NW I/O device 108 may directly write (e.g., in accordance with RDMA (e.g., iWARP, IB, RoCE) protocol and/or in a manner that by-passes and/or is independent of OSE 32), in the manner commanded by one or more commands 105, one or more queue elements 116 and data 199 to one or more submission queues 114 and one or more buffers 130A, respectively. Thus, in effect, by issuing one or more commands 105 to NW I/O device 108, NW I/O device 106 may write one or more queue elements 116 and data 199 to one or more submission queues 114 and one or more buffers 130A, respectively.

One or more commands 105 also may comprise and/or specify one or more values 201 and one or more of the indicators 181 that may indicate one or more locations of one or more doorbells 170 to which one or more values 201 may be written. In response, at least in part, to these one or more values 201 and these one or more of the indicators 181 in one or more commands 105, NW I/O device 108 may directly write (e.g., in accordance with RDMA (e.g., iWARP, IB, RoCE) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to NW I/O device 108, NW I/O device 106 may ring doorbell 170.

According to some examples, the ringing of a doorbell that is associated with an entity may comprise and/or involve, at least in part, the writing one or more values to one or more memory locations (e.g., associated with, comprising, and/or embodying the doorbell) that may result in and/or trigger, at least in part, the entity performing, at least in part, one or more operations and/or actions. In some examples, the doorbells 170 and/or 192 may appear to HP/CPU 12 and/or server 20 as one or more respective memory locations (not shown) in respective memory (not shown) in NVMe controller 112 and/or NW I/O device 108, respectively.

In response, at least in part, to the ringing of doorbell 170, NVMe controller 112 may return to a fully operational state (e.g., if NVMe controller 112 had previously entered a reduced power state relative to this fully operational state), and may read one or more queue elements 116 that were written into one or more submission queues 114. NVMe controller 112 may then execute, at least in part, the one or more commands that are specified and/or embodied by one or more queue elements 116. This may result in NVMe controller 112 performing, at least in part, the one or more operations (e.g., one or more writes to storage 150 and/or mass storage 156 of data 199 stored in one or more buffers 130A) involving storage 150 and/or mass storage 156.

After completion, at least in part, of these one or more operations involving storage 150 and/or mass storage 156, NVMe controller 112 may generate and write, at least in part, one or more completion queue elements (CQE) 129 to one or more completion queues 124. Also after completion, at least in part, of these one or more operations involving storage 150 and/or mass storage 156, NVMe controller 112 or manageability module 109 may write, at least in part, one or more values to one or more doorbells 192 associated with NW I/O device 108. This may ring one or more doorbells 192. In response, at least in part, to the ringing of one or more doorbells 192, NW I/O device 108 may write (e.g., via one or more RDMA write operations) one or more completion queue elements 190 to one or more completion queues 120 and then forward the one or more completion queue elements 190 to one or more buffers 13 in client 10 (e.g., via one or more responses 197).

After one or more (e.g., several) such write and/or read operations involving storage 150 and/or mass storage 156 have been performed, at least in part, one or more agents 194 may carry out certain management functions. For example, one or more agents 194 may establish, at least in part, one or more submission queue entries/elements (E) 196A . . . 196N in one or more submission queues 126 associated with NW I/O device 108 and/or one or more submission queue entries/elements QE A . . . QE N in table 250 (see FIG. 2). As is discussed below, these elements 196A . . . 196N and/or QE A . . . QE N, when executed, at least in part, by NW I/O device 108, may permit and/or facilitate copying or forwarding, at least in part, one or more other queue entries (e.g., one or more NVMe controller 112 completion entries 129) to client 10 and/or NW I/O device 106 and/or data read by NVMe controller 112.

These management functions also may include the updating (e.g., appropriately advancing), at least in part, by one or more agents 194 of one or more pointers (e.g., ring pointers PNTR 202) associated with one or more queue pairs (e.g., submission/completion queue pair 114, 120 and/or submission/completion queue pair 126, 124) associated with the NW I/O device 108 and the NVMe controller 112. This may permit new entries to the queue pairs to be stored at locations that will not result in erroneous overwriting of other entries in the queue pairs. Additionally, as part of these management functions, the one or more agents 194 may indicate one or more of the buffers 130A . . . 130N that may be available to be reused.

As another example, one or more queue elements 116 may command that NVMe controller 112 perform one or more read operations involving storage 150 and/or mass storage 156. Therefore, one or more commands 105 also may include and/or specify, at least in part, one or more locations (e.g., Namespaces) in storage 150 and/or mass storage 156 from which NVMe controller 112 is to read data 199, as a result of executing one or more queue elements 116.

In response, at least in part, to receipt of one or more commands 105, NW I/O device 108 may directly write (e.g., in accordance with an RDMA (e.g., iWARP, IB, RoCE) protocol and/or in a manner that by-passes and/or is independent of OSE 32), in the manner commanded by one or more commands 105, one or more queue elements 116 to one or more submission queues 114. Thus, in effect, by issuing one or more commands 105 to NW I/O device 108, NW I/O device 106 may write one or more queue elements 116 to one or more submission queues 114 and one or more buffers 130A, respectively.

In this example, one or more commands 105 also may comprise and/or specify one or more values 201 and one or more of the indicators 181 that may indicate one or more locations of one or more doorbells 170 to which one or more values 201 are to be written. In response, at least in part, to these one or more values 201 and these one or more of the indicators 181 in one or more commands 105, NW I/O device 108 may directly write (e.g., in accordance with an RDMA (e.g., iWARP, IB, RoCE) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to NW I/O device 108, NW I/O device 106 may ring doorbell 170.

In response, at least in part, to the ringing of doorbell 170, NVMe controller 112 may return to a fully operational state (e.g., if NVMe controller 112 had previously entered a reduced power state relative to this fully operational state), and may read one or more queue elements 116 that were written into one or more submission queues 114. NVMe controller 112 then may execute, at least in part, the one or more commands that are specified and/or embodied by one or more queue elements 116. This may result in NVMe controller 112 performing, at least in part, the one or more operations (e.g., one or more reads of storage 150 and/or mass storage 156 to obtain data 199) involving storage 150 and/or mass storage 156 and storing data 199 in one or more buffers (e.g., one or more buffers 130A).

After completion, at least in part, of these one or more operations involving storage 150 and/or mass storage 156, NVMe controller 112 may generate and write, at least in part, one or more completion queue elements 129 to one or more completion queues 124. Also after completion, at least in part, of these one or more operations involving storage 150 and/or mass storage 156, NVMe controller 112 also may write, at least in part, one or more values to one or more doorbells 192 associated with NW I/O device 108. This may ring one or more doorbells 192. In response, at least in part, to the ringing of one or more doorbells 192, NW I/O device 108 may obtain queue elements 129 from the one or more completion queues 124 and forward or write one or more completion queue elements 190 to one or more completion queues 120 to facilitate the transfer of data 199 (e.g., via on or more RDMA write operations with NW I/O device 106) to one or more buffers 13 in client 10 (e.g., via one or more responses 197). Alternatively, manageability module 109 may obtain queue elements 129 from completion queues 124 and forward or write completion queue elements 190 to completion queues 120 to facilitate the transfer of data 199 to buffers 13.

According to some examples, command interface 110 may be asynchronous in that, for example, completion queue elements may not be stored in an order in one or more completion queues 120 that corresponds to (1) the order in which command queue elements are stored in the one or more submission queues 114, (2) the order in which such command queue elements are forwarded for execution and/ or completion by the NVMe controller 112, and/or (3) the order in which completion queue elements 190 are stored in one or more completion queues 120 and/or provided to NW I/O device 106 and/or client 10. In operation, NW I/O device 106 and/or client 10 may appropriately reorder, in the case of write commands issued from the client 10 and/or NW I/O device 106, corresponding completion queue elements 190 received from NW I/O device 108. However, in the case of read commands, in this embodiment, in order to permit respective data read from storage 150 and/or mass storage 156 to be appropriately associated with corresponding completion queue elements 190 for transmission to client 10 and/or NW I/O device 106, each completion queue element (e.g., completion queue element 190) resulting from completion indications placed in completion queues 120 by NW I/O device 108 may include the elements illustrated in FIG. 2.

Figure 2:
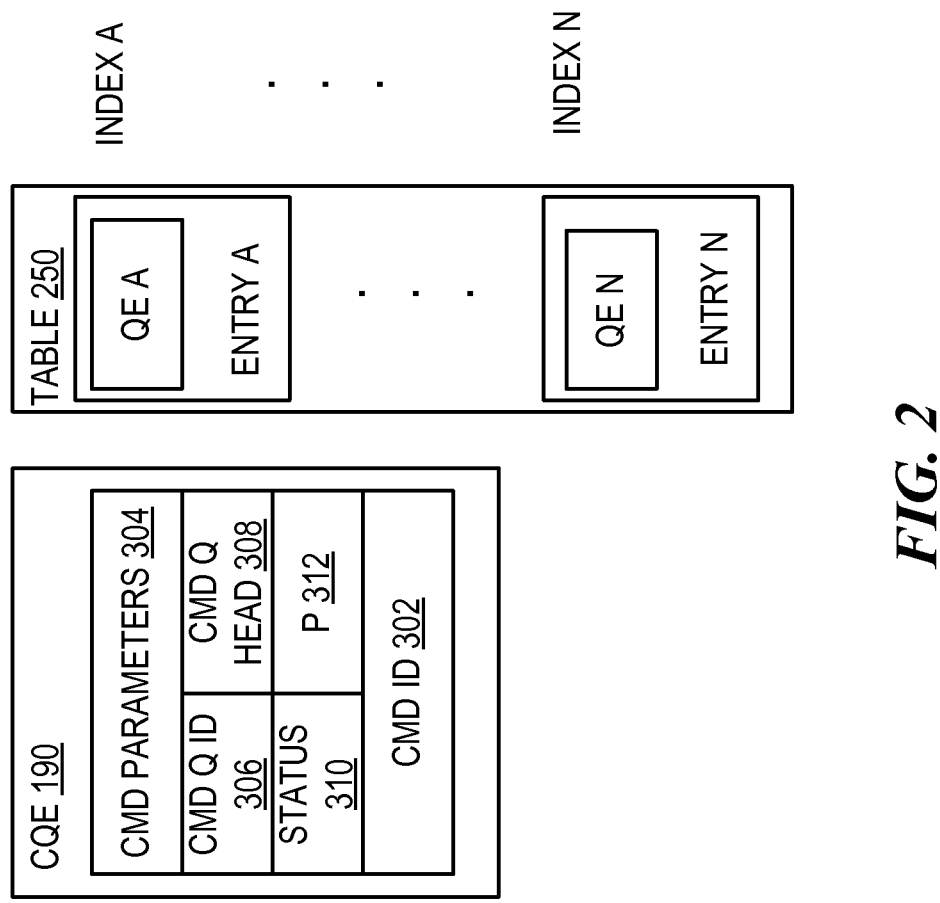
FIG. 2 illustrates an example completion queue element.

As shown in FIG. 2, completion queue element (e.g., completion queue element 190) may include one or more command parameters 304, one or more command queue identifiers 306, one or more command queue head position indicators 308, status information 310, one or more queue phase bit (P) 312, and/or one or more command identifiers 302. One or more command parameters 304 may be and/or indicate one or more command specific parameters of the one or more queue elements 116 and/or commands 105 that may correspond to and/or be associated with the one or more completion queue elements 190. One or more command queue identifiers 306 may indicate and/or specify the one or more submission queues 114 to which the one or more queue elements 116 were written. One or more command queue head position indicators 308 may indicate the current position (e.g., in the one or more submission queues 114 identified by one or more command queue identifiers 306) at which the one or more queue elements 116 may be located. Status information 310 may indicate whether the one or more commands 105 and/or one or more queue elements 116 were successfully performed by the NVMe controller 112. One or more phase bits 312 may indicate whether the one or more completion queue elements 190 constitute the most recently added valid entry (e.g., to service) in one or more completion queues 120. One or more command identifiers 302 may indicate, at least in part, and/or be identical to one or more corresponding command identifiers in the corresponding one or more queue elements 116. Command identifiers 302 may permit one or more completion queue elements 190 to be correctly associated with one or more corresponding queue elements 116 and/or with the respective data 199 read from the storage 150 and/or mass storage 156 as a result of the execution of these one or more corresponding queue elements 116.

In some examples, one or more command identifiers 302 may be selected so as not to collide with and/or be identical to any other command identifiers that may be currently used by any completion queue elements that have not yet been provided to client 10 and/or NW I/O device 106 by NW I/O device 108. The command identifiers that may be used in system 100 may be pre-calculated and/or pre-generated, and may be used as respective indices INDEX A . . . INDEX N for respective entries ENTRY A . . . ENTRY N in a table 250 that may be stored, at least in part, in memory 21. Each of the entries ENTRY A . . . ENTRY N in the table 250 may store one or more respective pre-calculated and/or pre-generated command queue elements QE A . . . QE N that may be associated with NW I/O device 108. Each respective element QE A . . . QE N may be associated with one or more respective buffers in one or more buffers 130A . . . 130N. Each of the buffers in one or more buffers 130A . . . 130N into which NVMe controller 112 may store data read from storage 150 and/or mass storage 156 also may be associated with one or more respective submission identifiers used in system 100 and/or respective entries ENTRY A . . . ENTRY N.

The command queue elements QE A . . . QE N may be stored and/or maintained in table 250 by client 10 and/or one or more agents 194. If one or more buffers 130A . . . 130N are statically allocated, table 250 may be static, and may correspond in terms of, for example, allocation characteristics to one or more buffers 13 that may be allocated in the client 10.

By way of example, after NVMe controller 112 reads data 199 from storage 150 and/or mass storage 156, NVMe controller 112 may store the data 199 in one or more buffers (e.g., one or more buffers 130A) that may be associated with one or more command identifiers 302, and may send an indication to NW I/O device 108 that an access command has been completed, e.g., ringing one or more doorbells 192. In response, at least in part, to NVMe controller 112 ringing one or more doorbells 192, NW I/O device 108 may determine, based at least in part upon one or more queue phase bits 312, the one or more most recently added valid completion queue in one or more completion queues 120. NW I/O device 108 may use the one or more command identifiers 302 in one or more completion queue elements 190 to index into table 250 to locate the one or more entries (e.g., one or more entries ENTRY A) and one or more command queue elements (e.g., one or more queue elements QE A) in table 250 that may be associated with and/or identified, at least in part, by one or more command identifiers 302. NW I/O device 108 may execute, at least in part, one or more commands that may be associated with and/or embodied by these one or more command queue elements QE A. This may result, at least in part, in NW I/O device 108 reading one or more buffers 130A to obtain data 199, and transmitting data 199 and one or more completion queue elements 190 to NW I/O device 106 and/or client 10 (e.g., via one or more responses 197). As a result, data 199 and/or one or more completion queue elements 190 may be copied into one or more client buffers 13.

Alternatively, in some examples, NW I/O device 108 may comprise, at least in part, a state machine (not shown). This state machine may be independent and/or separate from, at least in part, of one or more submission queues 114 that may be associated with and/or utilized by NW I/O device 108. This state machine may locate one or more command queue elements QE A in table 250 based at least in part upon one or more command identifiers 302, and may copy the one or more queue elements QE A into one or more corresponding submission queue elements 196A in one or more submission queues 126. The state machine then may signal NW I/O device 108 to access and execute, at least in part, one or more submission queue elements 196A in one or more submission queues 126.

Further alternatively, without departing from these examples, prior to completing one or more read operations involving storage 150 and/or mass storage 156, NVMe controller 112 may locate and/or select, at least in part, one or more queue elements QE A in and/or from table 250, based at least in part upon one or more command identifiers 302. NVME controller 112 then may write into one or more completion queue elements 190 into one or more completion queues 120, and may write one or more queue elements QE A into one or more corresponding submission queue elements 196A in one or more submission queues 126. NVME controller 112 then may ring one or more doorbells 192. This may result in NW I/O device 108 accessing and executing, at least in part, one or more submission queue elements 196A in one or more submission queues 126. This may result, at least in part, in NW I/O device 108 reading one or more buffers 130A to obtain data 199, and transmitting data 199 and one or more completion queue elements 190 to NW I/O device 106 and/or client 10 (e.g., via one or more responses 197). As a result, data 199 and/or one or more completion queue elements 190 may be copied into one or more client buffers 13.

In this alternative, firmware and/or one or more agents 194 executed, at least in part, by NW I/O device 108, NVMe controller 112 or manageability module 109 may maintain per-queue-pair context information to indicate one or more queue pairs used for RDMA transactions. This context information also may include various pointers (e.g., to one or more arrays of submission queue elements 196A . . . 196N to move data from one or more buffers 130A . . . 130N to one or more buffers 13, and/or the head of one or more submission queues 126), one or more locations of one or more doorbells 192 and one or more values to ring the one or more doorbells 192, and/or local copies of head and/or pointers to the one or more submission queues 126. Various of these pointers (e.g., the head and tail pointers) may be dynamically updated by firmware executed by NVMe controller 112.

Additionally or alternatively, without departing from these examples, NW I/O device 108, manageability module 109 and/or NVMe controller 112 may be comprised, at least in part, in the not shown chipset, or in a not shown circuit board or device. Also additionally or alternatively, without departing from this embodiment, storage 150 and/or mass storage 156 may be comprised, at least in part, internally in server 20 or be external to server 20.

Further although the foregoing description has been made with reference to NW I/O device 108 being an RNIC, and NVMe controller 112 being an NVMe compliant storage controller, the principles of this embodiment may be applied to circumstances in which protocols other than and/or in addition to RDMA or NVMe may be employed, and/or in which NVMe controller 112 may be involved in executing and/or facilitating operations that do not involve storage 150 (e.g., other and/or additional input/output and/or communication-related operations). Accordingly, without departing from the above mentioned examples, NW I/O device 108 may utilize, and/or communications between client 10 and server 20 may employ, protocols other than and/or in addition to RDMA. Also, without departing from this embodiment, NW I/O device 108, manageability module 109 or NVMe controller 112 may be involved in executing and/or may facilitate execution of such other and/or additional operations that may employ protocols other than PCIe or NVMe protocols. In these additional and/or alternative arrangements, hardware and/or firmware circuitry (not shown) may be comprised in circuitry 118 that may permit, at least in part, writing to doorbells 170 and/or 192 via, e.g., one or more interrupt mechanisms (e.g., one or more message signaled interrupts (MSI/MSI-X) and/or other mechanisms). This embodiment should be viewed broadly as covering all such modifications, variations, and alternatives.

Thus, in some examples, circuitry may be arranged, at least in part, to enable a first NW I/O device in a client to access, via a second NW I/O device in a server that is remote from the client and in a manner that is independent of an operating system environment in the server, at least one command interface of another (e.g., storage, and/or another/additional type of) controller of the server. The NW I/O device in the client and the NW I/O device in the server may be or comprise respective remote direct memory access-enabled network interface controllers (e.g., controllers capable, at least in part, of utilizing and/or communicating via RDMA). The command interface may include at least one (e.g., storage, and/or other/additional type of) controller command queue. Such accessing may include writing at least one queue element to the at least one submission queue to command the another controller to perform at least one operation (e.g., involving storage, and/or involving one or more other and/or additional types of operations, such as, other and/or additional input/output operations) associated with the another controller (e.g., an NVMe controller). The other controller may perform the at least one operation in response, at least in part, to the at least one queue element. Many alternatives, variations, and modifications are possible. Some of these alternatives may include the use of a manageability module (e.g., manageability module 109) coupled between the NW I/O device and the NVMe controller at the server to facilitate the remote NW I/O device's access to the at least one command interface.

Thus, in some examples, the one or more command interfaces 110 of NVMe controller 112 in server 20 may be directly accessed by the client's NW I/O device 106 via one or more RDMA transactions, in a manner that by-passes, is independent of, and/or does not involve the server's OSE 32 and/or HP/CPU 12. Advantageously, this may permit storage commands, data, and completion messages to be communicated between the client and server much more quickly and efficiently, and with reduced latency. Furthermore, in this embodiment, interactions between NW I/O device 108 and NVMe controller 112 may be carried out entirely or almost entirely by hardware (e.g., utilizing peer-to-peer memory and doorbell writes), and also in a manner that by-passes, is independent of, and/or does not involve the server's OSE 32 and/or HP/CPU 12. Advantageously, this may permit such interactions to be carried out much more quickly and efficiently, and with reduce latency. Additionally, the above features of this embodiment may reduce the server's power consumption, heat dissipation, and the amount of bandwidth consumed by the OSE 32 and HP/CPU 12.

Many other modifications are possible. For example, as stated previously, in this embodiment, client 10 may comprise a plurality of clients. If RDMA is employed for communications between server 20 and the clients 10, in this embodiment, advantageously, the clients 10 may dynamically share buffers 130A . . . 130N, as a common pool of buffers, between or among the client 10 in carrying out their communications with server 20, NW I/O device 108, and/or NVMe controller 112. In order to permit such buffer sharing, NW I/O device 108 may be capable of manipulating, adjusting, and/or modifying, at least in part, buffer-specifying information that may be indicated, at least in part, in commands 105 provided to the server 20 by the clients 10 in order to allow the buffers 130A . . . 130N and/or other server resources to be shared among the clients 10 without resulting in, for example, contention-related issues.

For example, the one or more indicators 181 and/or STags/TTags indicated by the one or more indicators 181 may include respective information that NW I/O device 108 may associate with one or more buffers and/or buffer pools in the buffers 130A . . . 130N, instead of and/or in addition to one or more memory region handles. In this arrangement, the clients 10 may perform RDMA read operations utilizing such indicators 181 and NW I/O device 108 may perform write operations to the one or more buffers and/or buffer pools indicated by the respective information and/or indicators 181. In carrying out its operations, NW I/O device 108 may appropriately adjust the actual commands and/or command queue elements provided to NVMe controller 112 in order to result in the correct buffers, etc. being written to by NVMe controller 112 when NVMe controller 112 carries out such commands and/or command queue elements.

Alternatively or additionally, without departing from the above examples, NW I/O device 108 may include and/or be associated with a shared receive queue (not shown) to receive, for example, commands 105 from multiple clients 10. NW I/O device 108 may be capable of substituting, at least in part, one or more appropriate server buffer addresses, values, and/or other information into one or more portions (e.g., queue elements 116, values 201, indicators 181, and/or other information) of the received commands 105 to permit sharing of the structures in the one or more command interfaces 110 between or among multiple clients 10, without resulting in contention or other degradation in performance. In this arrangement, the clients may not be provided and/or utilize one or more STags to the storage controller's command queue and/or doorbell, and writing to these structures may be performed by the server's NW I/O device 108. Advantageously, this may permit multiple clients 10 that may be associated with and/or utilize the shared receive queue to utilize and/or share, at least in part, the same storage controller command queue, doorbell, and/or other structures.

For example, in the case of a write operation, one or more indicators 181, one or more values 201, and/or other information in one or more commands 105 may indicate, at least in part, one or more storage controller STags or TTags for the write operation (and related information), and/or one or more RDMA STags or TTags to one or more buffers to which one or more completion queue elements may be written. Based at least in part upon the one or more received commands 105 and/or other information stored in NW I/O device 108, NW I/O device 108 may select one or more buffers in buffers 130A . . . 130N and one or more locations in the submission queue 114 to which to post the data 199 to be written and one or more corresponding command queue elements to be forwarded to submission queue 126 associated with NVMe controller 112. NW I/O device 108 may post the data 199 and the one or more corresponding command queue elements in accordance with such selections, and thereafter, may ring doorbell 170. As posted by NW I/O device 108, the one or more command queue elements may indicate the one or more storage controller STags or TTags supplied in the one or more commands 105, command identifier 302, security context information (e.g., to permit validation of the one or more storage controller STags or TTags), and/or one or more STags/TTags to the one or more buffers to which data 199 has been posted. After NVMe controller 112 has completed, at least in part, the requested one or more write operations and posted one or more completion queue elements (e.g., to completion queue 124), NVMe controller 112 may ring doorbell 192. Based at least in part upon information in table 250, NW I/O device 108 may generate and forward to the one or more clients that provided the received command 105 one or more appropriate responses 197 via forwarding the completion queue elements from completion queue 124 to completion queue 120.

In the case of a read operation, generally analogous information may be provided in command 105 and generally analogous operations may be performed by NW I/O device 108 and/or NVMe controller 112. However, in the case of a read operation, the data 199 read by NVMe controller 112 may be stored by NVMe controller 112 to one or more of the buffers 130A . . . 130N specified by the NW I/O device 108, and may be read by the NW I/O device 108, instead of vice versa (e.g., as may be the case in a write operation). NW I/O device 108 may transmit the read data 199 to the one or more clients that provided the received command 105 in one or more responses 197. In the foregoing arrangement, command 105 may be similar or identical to a command that may be utilized by a client to access storage local to the client, at least from the vantage point of one or more client-executed applications initiating such access. Advantageously, this may permit remote operations and/or RDMA transactions of the types previously described to be substantially transparent to these one or more client-executed applications.

Thus, in some examples, advantageously, it may be possible for multiple clients to share the storage controller's command queue, doorbells, and/or the server's buffers, and/or to write to these structures (via the server's NW I/O device) using an RDMA protocol, without suffering from resource contention issues (and/or other disadvantages) that might otherwise occur. The server's NW I/O device may be capable of modifying, at least in part, information associated with and/or comprised in the clients' commands 105 to facilitate such sharing and/or sharing of RDMA STag/TTag information between or among the clients. Advantageously, this may permit RDMA protocol to be employed for command communication and/or completion information between the server and multiple clients, with improved scalability, while reducing the memory consumption to implement such features, and without degradation in communication line rate.

Figure 3:
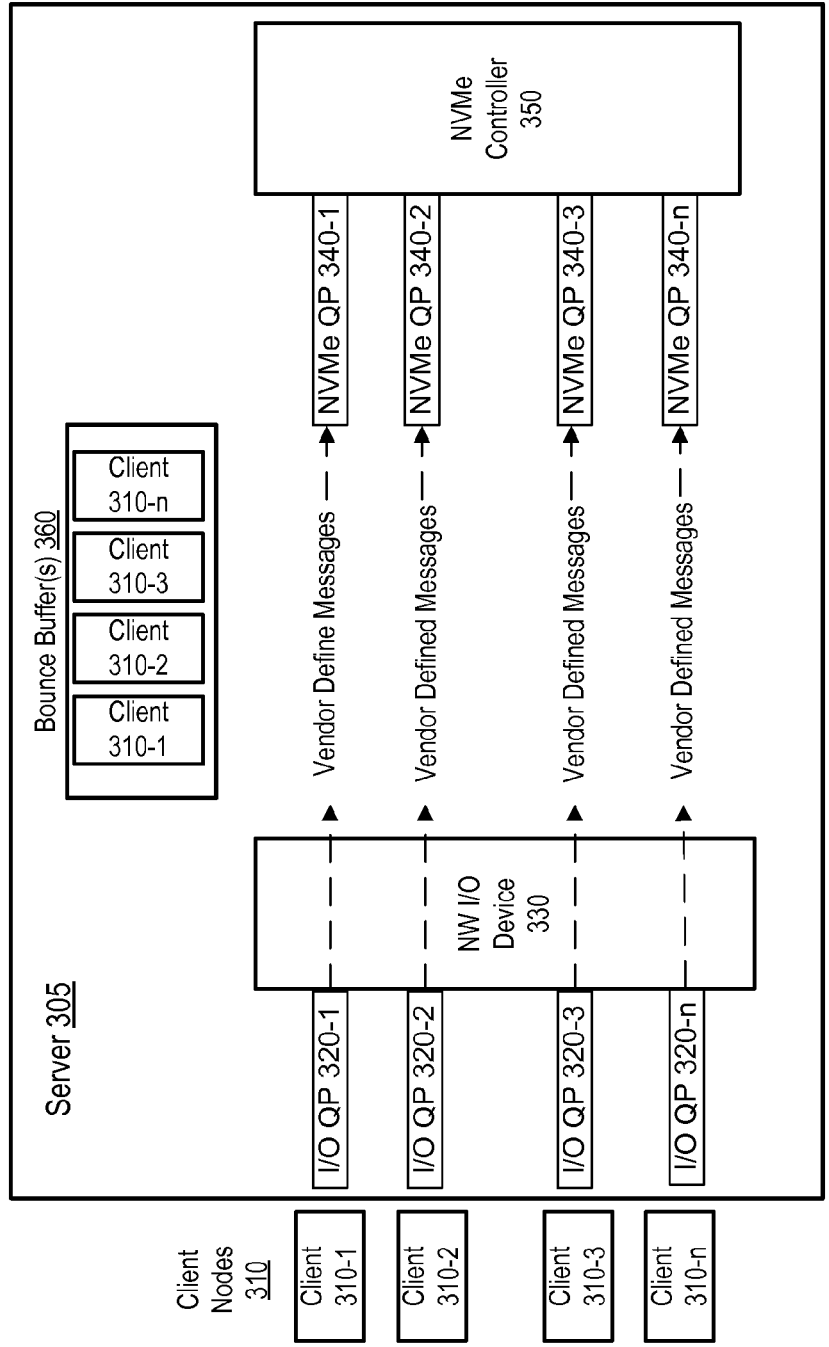
FIG. 3 illustrates a second example system.

FIG. 3 illustrates a second example system. As shown in FIG. 3, the second example includes a system 300. According to some examples, system 300 may include multiple client nodes 310-1 to 310-n (where "n" represents any positive integer greater than 3) and a server 305. For these examples, a NW I/O device 330, an NVMe controller 350 and bounce buffer(s) 360 may be located with and/or maintained at server 305.

In some examples, logic and/or features executed by circuitry for either network I/O device 330 and/or server 305 may allocate resources to clients 310-1 to 310-n to facilitate remote access to a storage device (not shown) controlled by NVMe controller 350. For these examples, separate I/O queue pairs (QPs) 320-1 to 320-n and separate NVMe QPs 340-1 to 340-n may be allocated or assigned to clients 310-1 to 310-n, respectively. Also, at least portions of bounce buffer(s) 360 may be allocated or assigned to clients 310-1 to 310-n. I/O QPs 320-1 to 320-n, NVME QPs 340-1 to 340-n or bounce buffer(s) 360 may be part of system memory resident at server 305. Alternatively, I/O QPs 320-1 to 320-n may be maintained at or within NW I/O device 330 and NVMe QP 340-1 to 340-n may be maintained at or with NVMe controller 350.

According to some examples, I/O QPs 320-1 to 320-n may separately include both command submission queues and command completion queues utilized by logic and/or features at NW I/O device 330 to exchange information with clients 310-1 to 310-n regarding commands to access the storage controlled by NVMe controller 350. Also, NVMe QPs 340-1 to 340-n may separately include command submission queues and command completion queues utilized by logic and/or features at NW I/O device 330 and at NVMe controller 350 to facilitate the relay of commands from clients 310-1 to 310-n to NVMe controller 350. For these examples, NVMe QPs 340-1 to 340-n are not directly accessible by clients 310-1 to 310-n. Since NVMe QPs 340-1 to 340-n are not directly accessible to clients 310-1 to 310-n, logic and/or features at NW I/O device 330 may be capable of validating commands received from these clients before they are forwarded or relayed to NVMe QPs 340-1 to 340-n.

Also, according to some examples, vendor defined messages may be exchanged between NW I/O device 330 and NVMe controller 350 to facilitate the forwarding of command submissions and command completions between I/O QPs 320-1 to 320-n and NVMe QPs 340-1 to 340-n. For these examples, both NW I/O device 330 and NVMe controller 350 may be capable of operating in compliance with the PCIe and/or NVMe Specifications. The vendor defined messages may include, for example, flow control information. These types of vendor defined messages may allow for formation of a generic-like interface for the exchange of command submissions and command completions between NW I/O device 330 and NVMe controller 350 without a need for detailed knowledge of how each respective device's QPs are arranged or configured. Vendor defined messages may be exchanged via various reserved portions indicated for NVMe or PCIe compliant messages for such commands to include, but not limited to, read, write, flush, write uncorrectable or compare commands.

In some examples, as described more below, logic and/or features executed by circuitry at NW I/O device 330 may receive a command from a client such as client 310-1. For these examples, the command may to be access storage (not shown) controlled by NVMe controller 350. The logic and/or features at NW I/O device 330 may include a first vendor defined message with the command to cause NVMe controller 350 to execute the command. For example, the first vendor defined message may be based on flow control information exchanged between NW I/O device 330 and NVMe controller 350. Based on the exchanged information, the first vendor defined message may identify one or more buffers from among bounce buffer(s) 360 and a given number of credits representing available buffer capacity that may be consumed or used when the command is to be executed by NVMe controller 350. Following execution of the command, logic and/or features executed by circuitry at NVMe controller 350 may send a command completion with a second vendor defined message. The second vendor defined message may identify the one or more buffers and a total credits available following completion of the command and thus may include updated flow control information.

In some examples, logic and/or features at NW I/O device 330 may use the second vendor defined message to determine a status of the completion or execution of the command and forward that determined status to client 310-1. The logic and/or features at NW I/O device 330 may forward the determined status by placing or writing queue elements in a command completion queue included in I/O QP 320-1 and notify client 310-1 of the writing as mentioned above for FIGS. 1 and 2.

According to some examples, the status determined via use of the second vendor defined message may be based on whether the total credits available indicate that the credits identified in the first vendor defined message were added back to the total credits. If added back, the status was a successful completion. If the total credits available do not indicate that the credits were added back, the status was an unsuccessful completion. An unsuccessful completion may prompt client 310-1 to resend the command or to perform or initiate some sort of error recovery operation.

Figure 4:
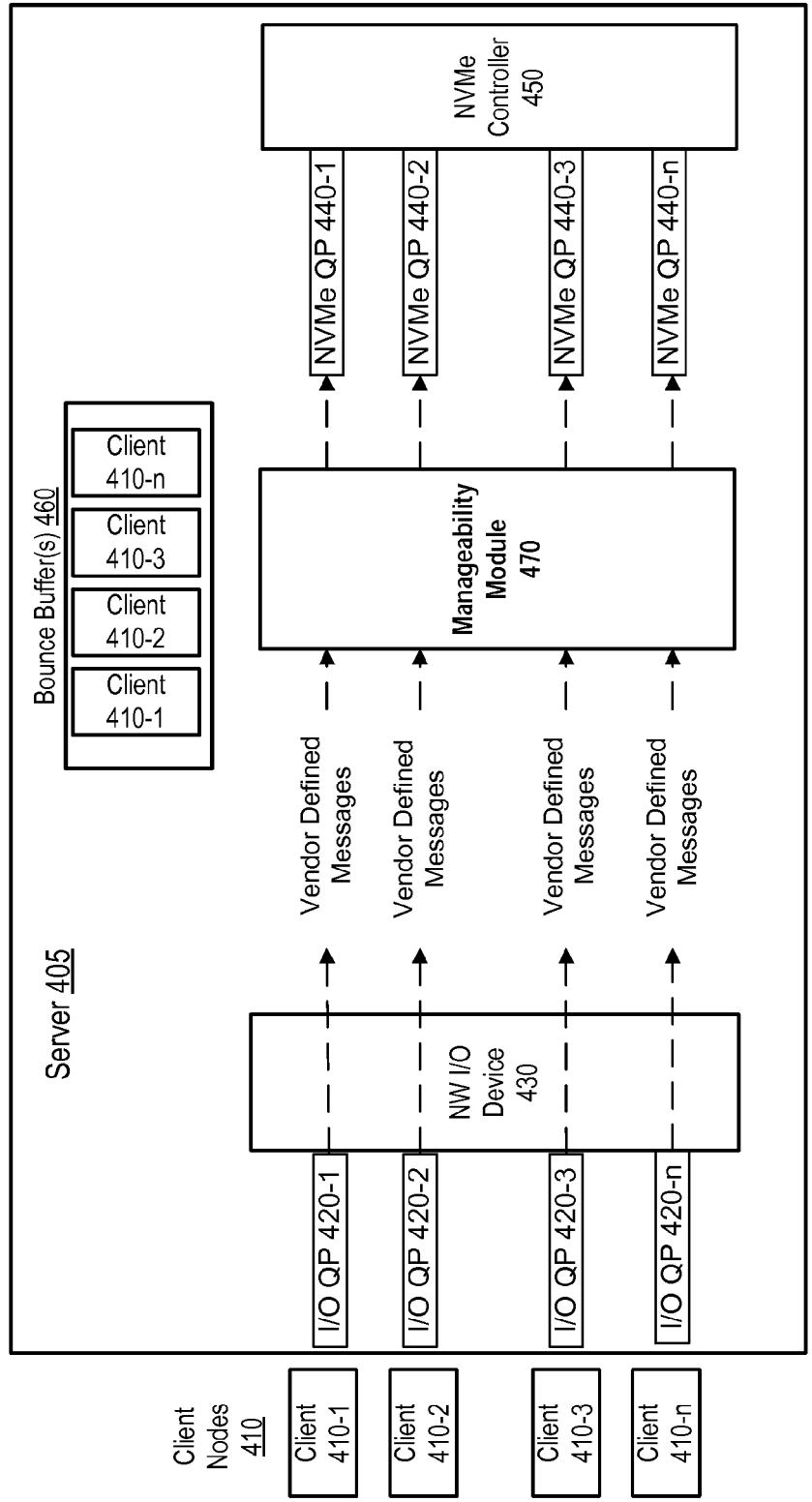
FIG. 4 illustrates a third example system.

FIG. 4 illustrates a third example system. As shown in FIG. 4, the third example system includes a system 400. According to some examples, system 400 is similar to system 300 with the exception of a manageability module 470 situated between a NW I/O device 430 and an NVMe controller 450. For these examples, rather than establishing a generic-type communication interface between a NW I/O device and an NVMe controller, the generic-type communication interface is established between the NW I/O device and a manageability module.

According to some examples, manageability module 470 may have adequate details about NVMe QPs 440-1 to 440-n to more effectively write command submissions and retrieve command completions from these QPs compared to NW I/O device 430. For these examples, manageability module 470 and NVMe controller 450 may be integrated on a same host platform for server 405. Meanwhile, NW I/O device 430 may be a detachable device that was not designed in an as integrated manner and thus may lack detailed information on the design of NVMe controller 450 and its associated NVMe QPs 440-1 to 440-n.

In some examples, logic and/or features executed by circuitry for NW I/O device 430 may receive a command from a client such as client 410-1. For these examples, the command may be to access storage (not shown) controlled by NVMe controller 450. The logic and/or features at NW I/O device 430 may include first vendor defined message with the command that may eventually cause NVMe controller 450 to execute the command. However, rather than directly exchanging the first vendor defined message with NVMe controller 450, manageability module 470 utilizes its knowledge of NVMe QP 440-1 to serve as an intermediary between the two devices and translate that knowledge to exchange information included in a vendor defined message such as flow control information with NW I/O device 430.

According to some examples, manageability module 470 may use the first vendor defined message forwarded by NW I/O device 430 with the command received from client 410-1 to a command submission queue included in NVMe QP 440-1. Manageability module 470 may then receive a command completion message via a command completion queue included in NVMe QP 440-1 and forward the command completion message to NW I/O device 430 with a second vendor defined message. The logic and/or features at NW I/O device 430 may then use the second vendor defined message to determine a status of the executed command. Similar to the process mentioned above for FIG. 3, the second vendor defined message may include updated credit-based information that may be used by the logic and/or features at NW I/O device 430 to determine whether the command was successfully completed and forward the determined status to client 410-1.

Although not shown in FIG. 3 or 4, in some examples, manageability module 470 and NVMe controller 450 may coexist on a same chip and communicates via vendor defined messages directly to NVMe controller 450 yet communicates to NW I/O device 430 using legacy completion and submission queue pairs.

FIG. 5 illustrates example vendor defined message (VDM) formats 510 and 520. In some examples, VDI formats 510 and 520 may be used to convey first and second vendor define messages, respectively. For these examples, a first vendor defined message conveyed in VDI format 510 may be included with a command forwarded from a NW I/O device. The first vendor defined message may include flow control information and field 512 may include one or more buffer IDs while field 514 may include credits used when the command is to be eventually executed by an NVMe controller. The second vendor defined message conveyed in VDI format 520 may be included in command completion forwarded either directly from the NVMe controller that executed the command or from a manageability module coupled between the NVMe controller and the NW I/O device. The second vendor defined message may include updated flow control information and field 522 may include one or more buffer IDs while field 524 may include credits available. The credits available included in field 524 may be used to determine whether the command was successfully completed or executed by the NVMe controller based on whether the credits available indicate that the credits identified in the first vendor defined message were added back to the credits available.

Figure 6:
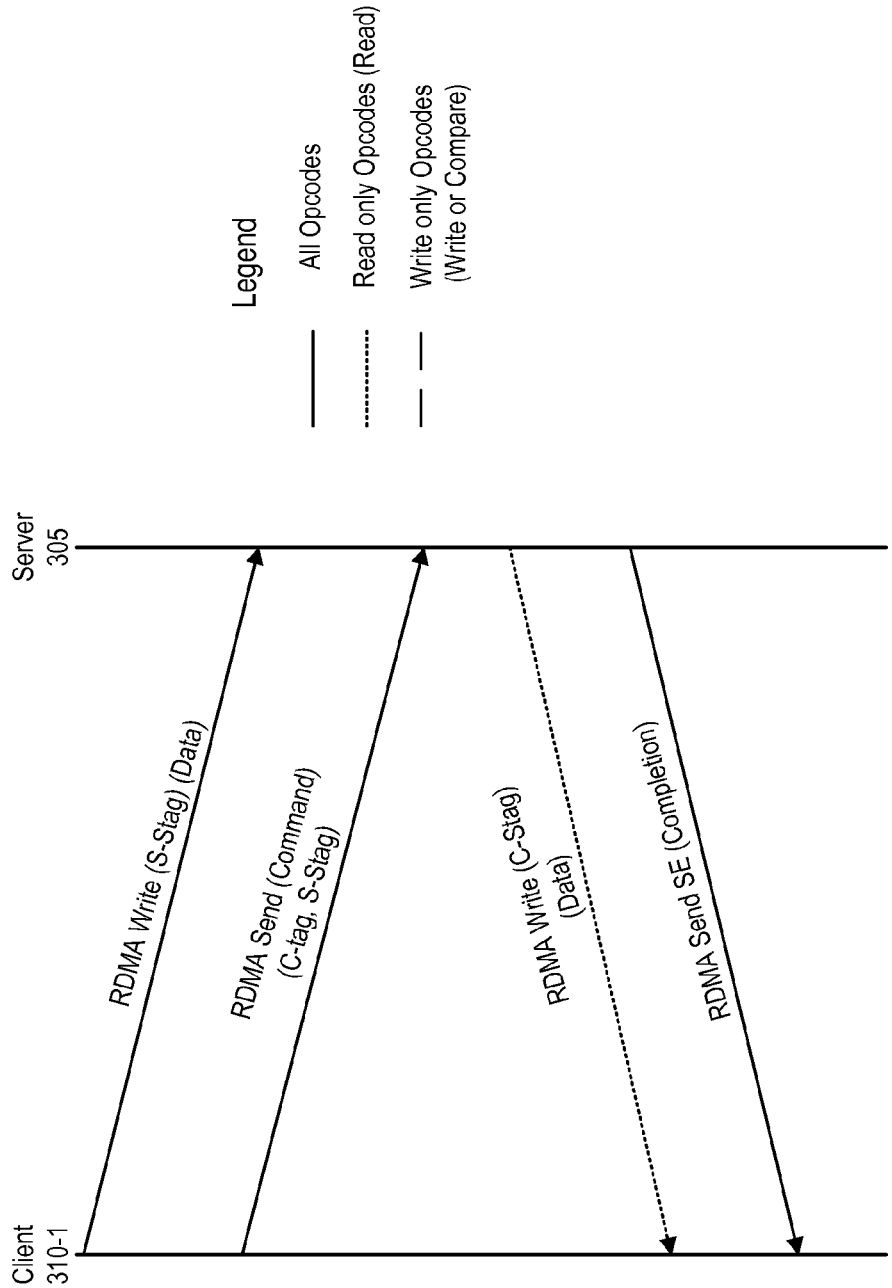
FIG. 6 illustrates an example communication flow.

FIG. 6 illustrates an example communication flow 600. In some examples, as shown in FIG. 6, communication flow 600 depicts example communications between client 310-1 and server 305. For these examples, the communications may be compatible with an RDMA (e.g., iWARP, IB, RoCE) protocol.

In some examples, starting from the top of FIG. 6, the first line "RDMA write (S-Stag)(Data)" may be an RDMA Write message carrying transaction data. The second line "RDMA Send (Command) (C-tag, S-Stag)" may be an RDMA Send message from client 310-1 that may include the command for access to the storage controlled by NVMe controller 350. The third line "RDMA Write (C-Stag) (Data)" may be an RDMA write message to carry data from a read of the storage and targeting a buffer (e.g., identified by C-Stag) maintained at client 310-1 that was originally indicated in a read request command. The fourth line "RDMA Send SE (Completion)" may be an RDMA Send message indicating that a solicited event (SE) such as a read command was completed by NVMe controller 350.

According to some examples, as shown in FIG. 6, solid lines may be related to all operation codes (Opcodes), dotted lines may be related to read only Opcodes and dashed lines may be related to write only Opcodes that may include write or compare commands.

Figure 7:
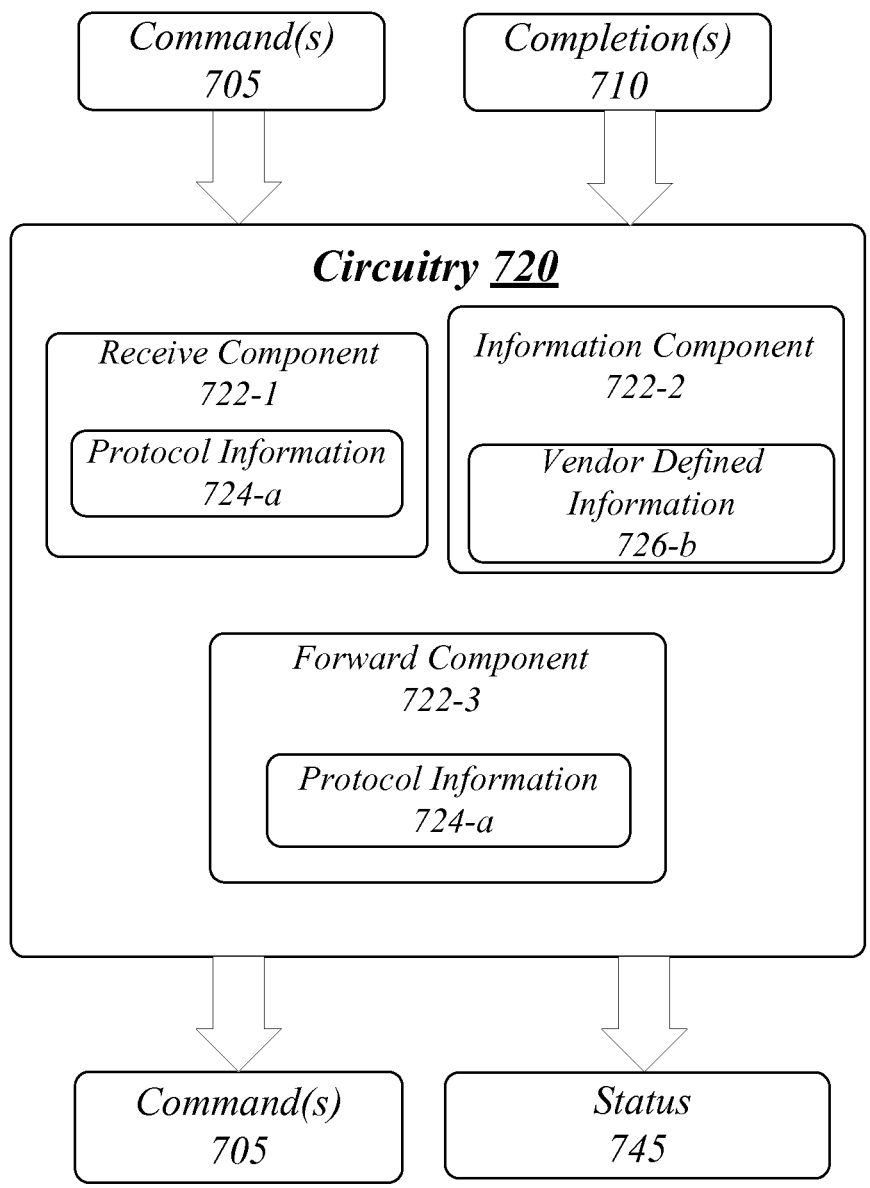
FIG. 7 illustrates an example block diagram for a first apparatus.

FIG. 7 illustrates an example block diagram of a first apparatus. As shown in FIG. 7, the first apparatus includes apparatus 700. Although apparatus 700 shown in FIG. 7 has a limited number of elements in a certain topology, it may be appreciated that the apparatus 700 may include more or less elements in alternate topologies as desired for a given implementation.

The apparatus 700 may be supported by circuitry 720 maintained at a network I/O device coupled to a server. Circuitry 720 may be arranged to execute one or more software or firmware implemented components 722-*a*. It is worthy to note that "a" and "b" and "c" and similar designators as used herein are intended to be variables representing any positive integer. Thus, for example, if an implementation sets a value for a=3, then a complete set of software or firmware for components 722-*a* may include components 722-1, 722-2 or 722-3. The examples presented are not limited in this context and the different variables used throughout may represent the same or different integer values.

According to some examples, circuitry 720 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 720 may also be an application specific integrated circuit (ASIC) and at least some components 722-*a* may be implemented as hardware elements of the ASIC.

According to some examples, apparatus 700 may include a receive component 722-1. Receive component 722-1 may be capable of receiving command(s) 705 via messages in an RDMA compliant (e.g., iWARP, IB, RoCE) protocol. Command(s) 705 may have been sent from remote clients to a server. For these examples, the server may be coupled to a NW I/O device having an apparatus 700. Command(s) 705 may include commands to access storage controlled by an NVMe controller located at or with the server. Receive component 722-1 may be capable of at least temporarily storing protocol information 724-*a* (e.g., in a data structure such as a lookup table (LUT)) in order to interpret or decode at least portions of command(s) 705. Receive component 722-1 may also be capable of receiving completion(s) 710 that may include indications of completions of commands forwarded to the NW I/O device as well as a vendor defined message that may have been forwarded with the completion(s) 710, e.g. updated flow control information. Receive component 722-1 may also obtain PCIe or NVMe protocol information from protocol information 724-*a* to interpret or decode completion(s) 710.

In some examples, apparatus 700 may also include an information component 722-2. Information component 722-2 may be capable of including a first vendor defined message with command(s) 705 received by receive component 722-1. The first vendor defined message may be obtained from or based on vendor defined information 726-*b* that may be stored in a data structure such as a LUT. Vender specific information 726-*b* may be based on information exchanged with either a manageability module or the NVMe controller that will eventually execute command(s) 705. That information may include flow control information. Information component 722-2 may also be capable of interpreting a second vendor defined message based on vendor defined information 726-*b* to determine a status of a completion included in completion(s) 710 received by receive component 722-1 following completion of command(s) 705 by the NVMe controller. The second vendor defined message received with completion(s) 710 may be in a message in the example format of VDI format 520.

In some examples, apparatus 700 may also include a forward component 722-3. Forward component 722-3 may be capable of forwarding command(s) 705 with the first vendor defined message to or towards the NVMe controller. For these examples, the first vendor defined message may be forwarded in a message in the example format of VDI format 510. Forward component 722-3 may also be capable of forwarding status 745 to the client that originally sent command(s) 705. Status 745, for example, may indicate the status of command(s) 705 based on the second vendor defined message received with completion(s) 710. Forward component 722-3 may be capable of at least temporarily storing protocol information 724-*a* (e.g., in an LUT) in order to encode command(s) 705 in PCIe or NVMe compliant format to be sent to or towards the NVMe controller or to encode at least portions of status 745 in an RDMA compliant (e.g., iWARP, IB, RoCE) protocol to be sent to the client that originated command(s) 705.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example of a first logic flow. As shown in FIG. 8, the first logic flow includes logic flow 800. Logic flow 800 may be representative of some or all of the operations executed by one or more logic, features, or devices described herein, such as apparatus 700. More particularly, logic flow 800 may be implemented by receive component 722-1, information component 722-2 or forward component 722-3.

According to some examples, logic flow 800 at block 802 may receive a command from a client to access to a storage device controlled by an NVMe controller maintained at a server. For example, command(s) 705 may be received by receive component 722-1 included in an apparatus 700 for a NW I/O device coupled to the server.

In some examples, logic flow 800 at block 804 may include a first vendor defined message with the command to cause the NVMe controller to execute the command. For example, information component 722-2 may use information included in vendor defined information 726-*b* to convey the first vendor defined message in a message in the example format of VDI format 510 that includes flow control information.

According to some examples, logic flow 800 at block 806 may then forward the command with the first vendor defined message to the NVMe controller. For these examples, forward component 722-3 may forward command(s) 705 with the first vendor defined message in a message in the example format of VDI format 510 that includes flow control information. In some examples, an intermediary such as a manageability module may receive command(s) 705 with the first vendor defined message and may use the first vendor defined message to cause the NVMe controller to execute command(s) 705. In other examples, the NVMe controller may directly receive command(s) 705 with the first vendor defined message and based, at least in part, on the first vendor defined message the NVMe controller may execute command(s) 705.

In some examples, logic flow 800 at block 806 may receive a command completion message with a second vendor defined message from the NVMe controller. Also at block 806, logic flow 800 may forward a status of the executed command to the client based, at least in part, on the second vendor defined message. For these examples, completion(s) 710 with second vendor defined message may be received by receive component 722-1. Also, information component 722-2 may interpret the second vendor defined message to determine a status of completion of command(s) 705 using vendor defined information 726-b. The second vendor defined message received with completion(s) 710 may include updated credit-based flow information that may be used by information component 722-2 to determine whether command(s) 705 were successfully completed. Forward component 722-3 may then forward status 745 to the client that may indicate the determined status.

FIG. 9 illustrates an example of a first storage medium. As shown in FIG. 9, the first storage medium includes storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 10 illustrates an example NW I/O device 1000. In some examples, as shown in FIG. 10, NW I/O device 1000 may include a processing component 1040, other platform components 1050 or a communications interface 1060. According to some examples, NW I/O device 1000 may be implemented in a NW I/O device coupled to a server in a system or data center as mentioned above.

According to some examples, processing component 1040 may execute processing operations or logic for apparatus 700 and/or storage medium 900. Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 1060 may include logic and/or features to support a communication interface. For these examples, communications interface 1060 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification, the RDMA Protocol specification, the IEEE 802-2-2008 specification, RFC 791 or RFC 793.

The components and features of NW I/O device 1000 may be implemented using any combination of discrete circuitry, application specific integrated circuits (ASICs), logic gates and/or single chip architectures. Further, the features of NW I/O device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary NW I/O device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 11:
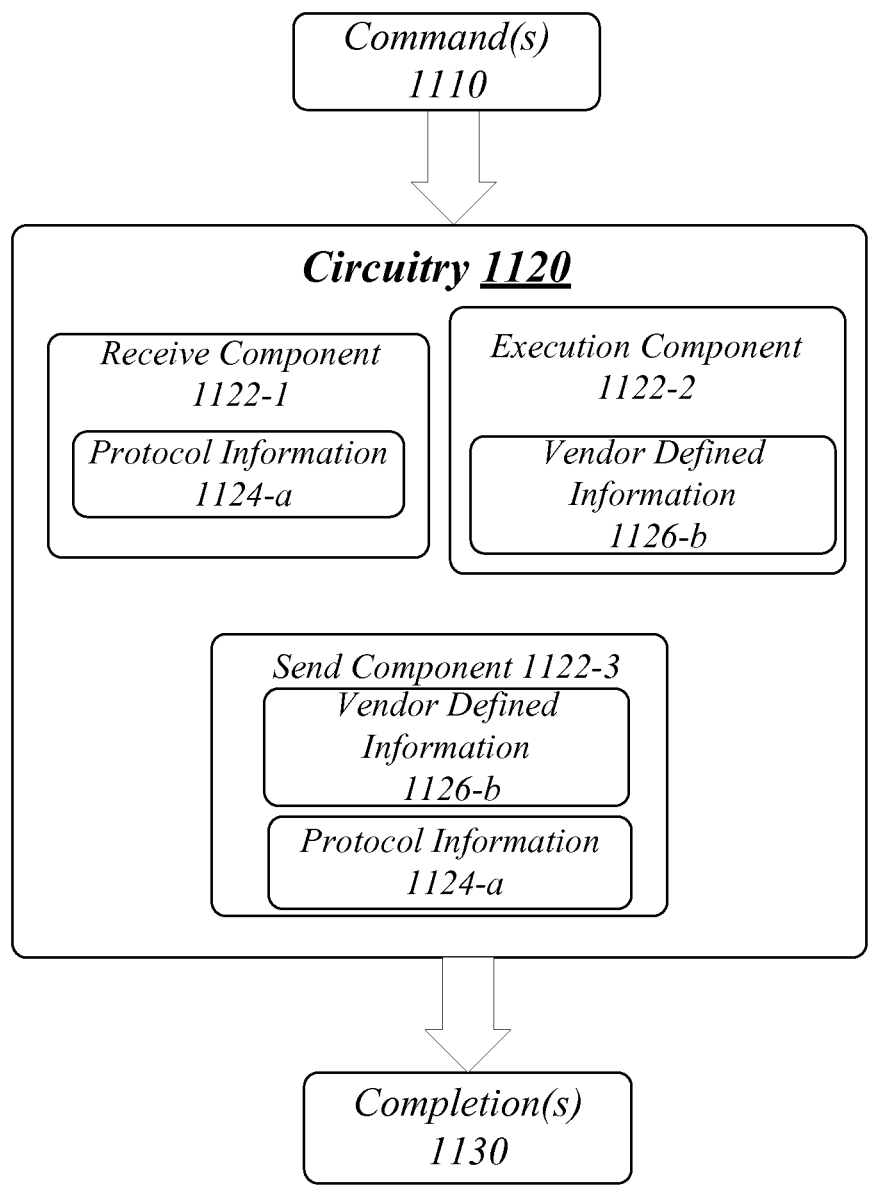
FIG. 11 illustrates an example block diagram for a second apparatus.

FIG. 11 illustrates an example block diagram of a second apparatus. As shown in FIG. 11, the second apparatus includes apparatus 1100. Although apparatus 1100 shown in FIG. 11 has a limited number of elements in a certain topology, it may be appreciated that the apparatus 1100 may include more or less elements in alternate topologies as desired for a given implementation.

The apparatus 1100 may be supported by circuitry 1120 maintained at an NVMe controller located at or with a server. Circuitry 1120 may be arranged to execute one or more software or firmware implemented components 1122-*a*. It is worthy to note that "a" and "b" and "c" and similar designators as used herein are intended to be variables representing any positive integer. Thus, for example, if an implementation sets a value for a=3, then a complete set of software or firmware for components 1122-*a* may include components 1122-1, 1122-2 or 1122-3. The examples presented are not limited in this context and the different variables used throughout may represent the same or different integer values.

According to some examples, circuitry 1120 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 1120 may also be an application specific integrated circuit (ASIC) and at least some components 1122-*a* may be implemented as hardware elements of the ASIC.

According to some examples, apparatus 1100 may include a receive component 1122-1. Receive component 1122-1 may be capable of receiving command(s) 1110 via messages in a PCIe and/or NVMe compliant protocol. Command(s) 1110 may have been originally sent from remote clients to the server and then forwarded by a NW I/O device. Command(s) 1110 may have been forwarded with first vendor defined message. Command(s) 1110 may include commands to access storage controlled by an NVMe controller having an apparatus 1100. Receive component 1122-1 may be capable of at least temporarily storing protocol information 1124-*a* (e.g., in a data structure such as a lookup table (LUT)) in order to interpret or decode at least portions of command(s) 1110.

In some examples, apparatus 1100 may also include an execution component 1122-2. Execution component 1122-2 may be capable of executing command(s) 1110 received by receive component 1122-1 based, at least in part, on the first vendor defined message forwarded with command(s) 1110. The first vendor defined message may be obtained from or based on vendor defined information 1126-*b* that may be stored in a data structure such as a LUT. Vender specific information 1126-*b* may be based on information exchanged with the NW I/O device. That information may include flow control information.

In some examples, apparatus 1100 may also include a send component 1122-3. Send component 1122-3 may be capable of sending completion(s) 1130 with the second vendor defined message to the NW I/O device. For these examples, the second vendor defined message may be forwarded in a message in the example format of VDI format 520. Send component 1122-3 may be capable of at least temporarily storing protocol information 1124-*a* (e.g., in an LUT) in order to encode completion(s) 1130 in PCIe or NVMe compliant format or to be sent to the I/O NW device.

Figure 12:
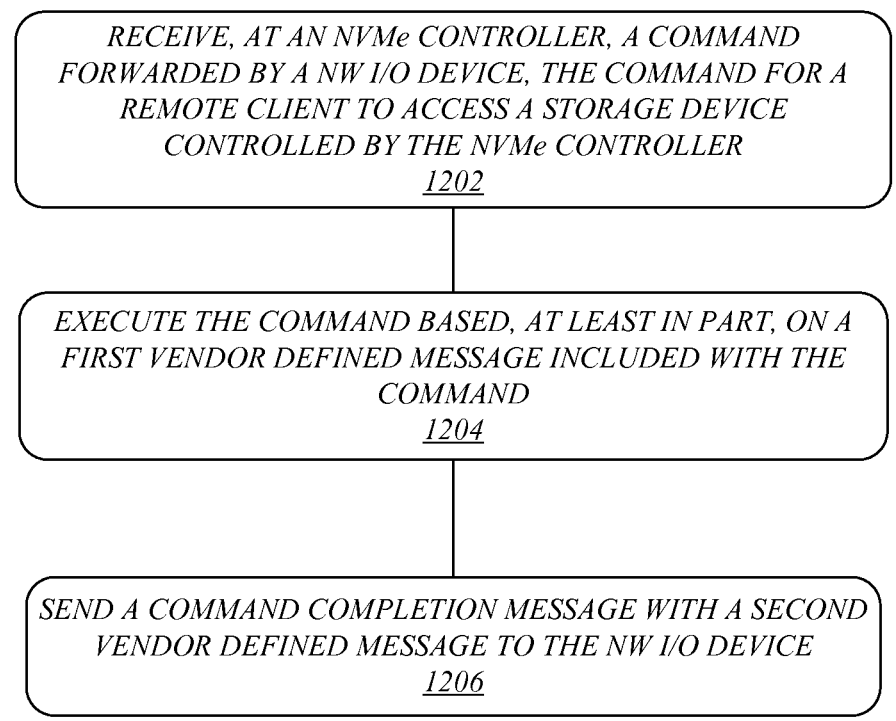
FIG. 12 illustrates an example of a second logic flow.

FIG. 12 illustrates an example of a second logic flow. As shown in FIG. 12, the second logic flow included logic flow 1200. Logic flow 1200 may be representative of some or all of the operations executed by one or more logic, features, or devices described herein, such as apparatus 1100. More particularly, logic flow 1200 may be implemented by receive component 1122-1, execution component 1122-2 or send component 1122-3.

According to some examples, logic flow 1200 at block 1202 may receive, at an NVMe controller, a command forwarded by a NW I/O device. Also at block 1202, the command may be for a remote client to access a storage device controlled by the NVMe controller. For example, command(s) 1110 may be received by receive component 1122-1 included in an apparatus 1100 for an NVMe controller maintained at the server.

In some examples, logic flow 1200 at block 1204 may execute the command based, at least in part, on first vendor defined message included with the command. For example, execution component 1122-2 may use information included in vendor defined information 1126-*b* to interpret the first vendor defined message that may include flow control information in a message received in VDI format 510

According to some examples, logic flow 1200 at block 1206 may then send a command completion message with second vendor defined message to the NW I/O device. For these examples, send component 1122-3 may send completion(s) 1130 with the second vendor defined message in a message in the example format of VDI format 520 that include updated flow control information. The NW I/O device may use the second vendor defined message to determine a status of the completion of command(s) 1110 and then forward the status to the client that originated command(s) 1110.

Figure 13:
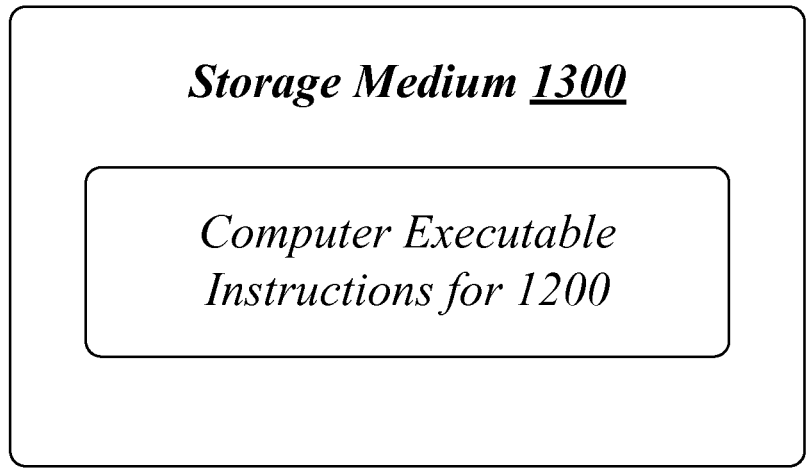
FIG. 13 illustrates an example of a second storage medium.

FIG. 13 illustrates an example of a second storage medium. As shown in FIG. 13, the second storage medium includes storage medium 1300. Storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions to implement logic flow 1200. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
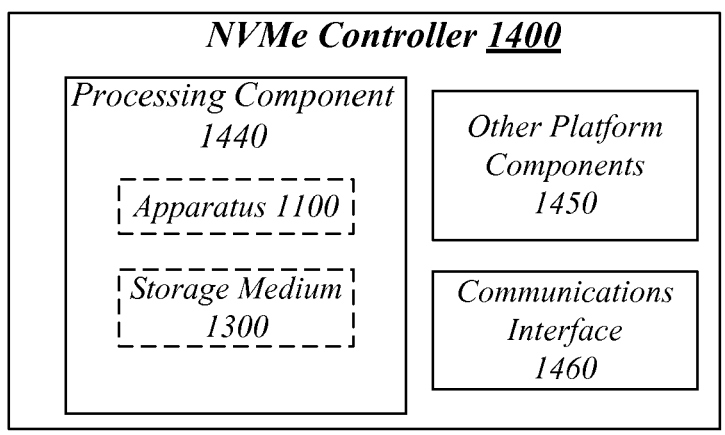
FIG. 14 illustrates an example Non-Volatile Memory Express (NVMe) controller.

FIG. 14 illustrates an example NVMe controller 1400. In some examples, as shown in FIG. 14, NVMe controller 1400 may include a processing component 1440, other platform components 1450 or a communications interface 1460. According to some examples, NVMe controller 1400 may be implemented in a controller coupled to or maintained at a server in a system or data center as mentioned above.

According to some examples, processing component 1440 may execute processing operations or logic for apparatus 1100 and/or storage medium 1300. Processing component 1440 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1450 may include common computing elements, such as one or more processors, multi-core processors, co-processors, memory units, chipsets, controllers, peripherals, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 1460 may include logic and/or features to support a communication interface. For these examples, communications interface 1460 may include one or more communication interfaces that operate according to various communication protocols or standards to communicate over communication links. Communications may occur via use of communication protocols or standards described in one or more industry standards (including progenies and variants) such as those associated with the PCIe specification or the NVMe specification.

The components and features of NVMe controller 1400 may be implemented using any combination of discrete circuitry, application specific integrated circuits (ASICs), logic gates and/or single chip architectures. Further, the features of NVMe controller 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary NVMe controller 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry for a network input/output device coupled to a server;
   a receive component for execution by the circuitry to receive a command from a client remote to the server, the command for the client to access a storage device controlled by a Non-Volatile Memory Express (NVMe) controller maintained at the server;
   an information component for execution by the circuitry to include a first vendor defined message with the command to cause the NVMe controller to execute the command;
   a forward component for execution by the circuitry to forward the command with the first vendor defined message to the NVMe controller, the NVMe controller to receive the command and execute the command based, at least in part, on the first vendor defined message;
   the receive component to receive a command completion message from the NVMe controller with a second vendor defined message; and
   the forward component to forward a status of the executed command to the client based, at least in part, on the second vendor defined message.

2. The apparatus of claim 1, the network input/output device, the storage device and the NVMe controller arranged to operate in compliance with an industry standard to include PCIe Base Specification, revision 3.0 or NVMe Specification, revision 1.1.

3. The apparatus of claim 1, the first vendor defined message comprises flow control information exchanged between the network input/output device and the NVMe controller and the second vendor defined message comprises updated flow control information.

4. The apparatus of claim 1, the command with the first vendor defined message received by a manageability module coupled between the network input/output device and the NVMe controller, the manageability module to use the first vendor defined message to forward the command to the NVMe controller via a command submission queue maintained by the NVMe controller, the manageability module to receive a command completion message via a command completion queue maintained by the NVMe controller and forward the command completion message to the network input/output device with a second vendor defined message, the receive component to receive the command completion message with the second vendor defined message and the forward component to forward the status of the executed command to the client based, at least in part, on the second vendor defined message.

5. The apparatus of claim 4, the network input/output device, the manageability module, the storage device and the NVMe controller arranged to operate in compliance with an industry standard to include PCIe Base Specification, revision 3.0 or NVMe Specification, revision 1.1, the first vendor defined message comprises flow control information exchanged between network input/output device and the manageability module and the second vendor defined message comprises updated flow control information.

6. The apparatus of claim 1, the command received in a packet compatible with a remote direct memory access (RDMA) protocol to include one of Internet Wide Area RDMA protocol (iWARP), Infinband or RDMA over Converged Ethernet (RoCE).

7. The apparatus of claim 1, the command includes one of a flush command, a write command, a read command, a write uncorrectable command or a compare command.

8. The apparatus of claim 1, the storage device to include a hard disk drive (HDD) or a solid state drive (SSD), the SSD having non-volatile memory comprising at least one of 3-dimensional cross-point memory, flash memory, ferroelectric memory, silicon-oxide-nitride-oxide-silicon (SONGS) memory, polymer memory, nanowire, ferroelectric transistor random access memory (FeTRAM or FeRAM), nanowire or electrically erasable programmable read-only memory (EEPROM).

9. A method comprising:
   receiving, at a network input/output device coupled to a server, a command from a client remote to the server, the command for the client to access a storage device controlled by a Non-Volatile Memory Express (NVMe) controller maintained at the server;
   forwarding the command to the NVMe controller with a first vendor defined message, the NVMe controller to receive the command and execute the command based, at least in part, on the first vendor defined message;
   receiving a command completion message with a second vendor defined message from the NVMe controller; and
   forwarding a status of the executed command to the client based, at least in part, on the second vendor defined message.

10. The method of claim 9, comprising the network input/output device, the storage device and the NVMe controller arranged to operate in compliance with an industry standard to include PCIe Base Specification, revision 3.0 or NVMe Specification, revision 1.1.

11. The method of claim 10, the first vendor defined message comprises flow control information exchanged between the network input/output device and the NVMe controller and the second vendor defined message comprises updated flow control information.

12. The method of claim 9, the command received in a packet compatible with a remote direct memory access (RDMA) protocol to include one of Internet Wide Area RDMA protocol (iWARP), Infinband or RDMA over Converged Ethernet (RoCE).

13. The method of claim 9, the command includes one of a flush command, a write command, a read command, a write uncorrectable command or a compare command.

14. The method of claim 9, the storage device to include a hard disk drive or a solid state drive (SSD), the SSD having non-volatile memory comprising at least one of 3-dimensional cross-point memory, flash memory, ferroelectric memory, silicon-oxide-nitride-oxide-silicon (SONGS) memory, polymer memory, ferroelectric transistor random access memory (FeTRAM or FeRAM), nanowire or electrically erasable programmable read-only memory (EEPROM).

15. A method comprising:
receiving, at a Non-Volatile Memory Express (NVMe) controller coupled to a server, a command forwarded by a network input/output device coupled to the server, the command from a client remote to the server, the command for the client to access a storage device controlled by the NVMe controller;
executing the command based, at least in part, on a first vendor defined message received with the command, the first vendor defined message included with the command by the network input/output device prior to forwarding to the NVMe controller; and
sending a command completion message with a second vendor defined message to the network input/output device, the network input/output device to forward a status of the executed command to the client based, at least in part, on the second vendor defined message.

16. The method of claim 15, the storage device and the NVMe controller arranged to operate in compliance with an industry standard to include PCIe Base Specification, revision 3.0 or NVMe Specification, revision 1.1.

17. The method of claim 15, the first vendor defined message comprises flow control information exchanged between the network input/output device and the NVMe controller and the second vendor defined message comprises updated flow control information, the network input/output device to forward the status of the executed command to the client based, at least in part, on the updated flow control information.

18. The method of claim 15, receiving the command via a manageability module coupled between the NVMe controller and the network input/output device, the manageability module adding the first vendor defined message with the command forwarded from the network input/output device.

19. The method of claim 18, the network input/output device, the manageability module, the storage device and the NVMe controller arranged to operate in compliance with an industry standard to include PCIe Base Specification, revision 3.0 or NVMe Specification, revision 1.1, the first vendor defined message comprises flow control information exchanged between the network input/output device and the manageability module and the second vendor defined message comprises updated flow control information used by the network input/output device to forward the status of the executed command to the client.

20. At least one non-transitory machine readable medium comprising a plurality of instructions that in response to being executed on a network input/output device coupled to a server cause the network input/output device to:
receive a command from a client remote to the server, the command for the client to access a storage device controlled by a Non-Volatile Memory Express (NVMe) controller maintained at the server, the command received in a packet compatible with a remote direct memory access (RDMA) protocol to include one of Internet Wide Area RDMA protocol (iWARP), Infinband or RDMA over Converged Ethernet (RoCE);
forward the command to the NVMe controller with a first vendor defined message in the command, the NVMe controller to receive the command and execute the command based, at least in part, on the first vendor defined message;
receive a command completion message from the NVMe controller with a second vendor defined message; and
forward a status of the executed command to the client based, at least in part, on the second vendor defined message.

21. At least one non-transitory machine readable medium of claim 20, the command with the first vendor defined message received by a manageability module coupled between the network input/output device and the NVMe controller, the manageability module to use the first vendor defined message to forward the command to the NVMe controller via a command submission queue maintained by the NVMe controller, the manageability module to receive a command completion message via a command completion queue maintained by the NVMe controller and forward the command completion message to the network input/output device with the second vendor defined message.

22. At least one non-transitory machine readable medium of claim 21, the network input/output device, the manageability module, the storage device and the NVMe controller arranged to operate in compliance with an industry standard to include PCIe Base Specification, revision 3.0 or NVMe Specification, revision 1.1, the first vendor defined message comprises flow control information exchanged between network input/output device and the manageability module and the second vendor defined message comprises updated flow control information.

23. At least one non-transitory machine readable medium of claim 20, the command includes one of a flush command, a write command, a read command, a write uncorrectable command or a compare command.

* * * * *